US008629642B2

(12) United States Patent
Ward et al.

(10) Patent No.: US 8,629,642 B2
(45) Date of Patent: *Jan. 14, 2014

(54) CLOSED-LOOP MOTOR DRIVER COMPENSATION

(75) Inventors: Michael G. Ward, Wells, ME (US); David J. Haas, Weare, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,929

(22) Filed: Feb. 15, 2012

(65) Prior Publication Data

US 2012/0146570 A1    Jun. 14, 2012

Related U.S. Application Data

(63) Continuation of application No. 12/323,602, filed on Nov. 26, 2008, now Pat. No. 8,138,708.

(51) Int. Cl.
*G05B 6/02* (2006.01)

(52) U.S. Cl.
USPC ............................ 318/621; 318/560; 318/611

(58) Field of Classification Search
USPC .......................................... 318/560, 611, 621
See application file for complete search history.

(56) References Cited

U.S. PATENT DOCUMENTS

| 4,157,489 A | 6/1979 | Tal |
| 5,084,848 A | 1/1992 | Deguchi et al. |
| 5,801,462 A | 9/1998 | Yagoto et al. |
| 6,034,499 A | 3/2000 | Tranovich |
| 6,131,459 A | 10/2000 | Seale et al. |
| 6,323,614 B1 | 11/2001 | Palazzolo et al. |
| 6,459,665 B2 | 10/2002 | Chu |
| 7,936,144 B2 | 5/2011 | Vig et al. |
| 2005/0248662 A1 | 11/2005 | Yamazaki |
| 2006/0204232 A1 | 9/2006 | Weinberg et al. |
| 2008/0265822 A1 | 10/2008 | Menegoli et al. |
| 2009/0085558 A1 | 4/2009 | David et al. |
| 2010/0127655 A1 | 5/2010 | Ward et al. |

FOREIGN PATENT DOCUMENTS

| EP | 1 215 807 A | 6/2002 |
| EP | 1 215 807 A1 | 6/2002 |
| GB | 2 273 166 A | 6/1994 |

OTHER PUBLICATIONS

Notification Concerning Transmittal of International Preliminary Report on Patentability (Chapter 1 of the Patent Cooperation Treaty), PCT/US2009/057944, date of mailing Jun. 9, 2011, 1 page.
International Preliminary Report on Patentability (Chapter 1 of the Patent Cooperation Treaty), PCT/US2009/057944, date of mailing Jun. 9, 2011, 8 pages.
Notification of Transmittal of the International Search Report and Written Opinion of the International Searching Authority for PCT/US2009/057944, dated Dec. 14, 2009, 3 pages.
International Search Report for PCT/US2009/057944, dated Dec. 14, 2009, 3 pages.

(Continued)

*Primary Examiner* — Kawing Chan
(74) *Attorney, Agent, or Firm* — Daly, Crowley, Mofford & Durkee, LLP

(57) ABSTRACT

A control loop circuit for use in a closed-loop control system that controls a system such as a linear motor is presented. The control loop circuit includes a lead-lag compensator that features a lead compensation network configured to reduce output noise without substantially changing the effect of the lead compensation in the control system's frequency response.

10 Claims, 9 Drawing Sheets

(56) References Cited

OTHER PUBLICATIONS

Written Opinion of the International Searching Authority for PCT/US2009/057944, dated Dec. 14, 2009, 8 pages.
Richard C. Dorf and Robert H. Bishop, Modern Control Systems, Addison-Wesley, NY, Menlo Park, CA, 1998, p. 616.
D.H. Yeom, N.J. Park and S.Y. Jung, "Digital Controller of Novel Voice Coil Motor Actuator for Optical Image Stabilizer", International Conference on Control, Automation and Systems 2007, Oct. 17-20, 2007 in COEX, Seoul, Korea, pp. 2201-2206.
M. Oshima, T. Hayashi, S. Fujioka, T. Inaji, H. Mitani, J. Kajino, K. Ikeda and K. Komoda, "VHS Camcorder with Electric Image Stabilizer", IEEE Transactions on Consumer Electronics, vol. 35, No. 4, Nov. 1989, pp. 749-758.
U.S. Appl. No. 12/323,602, filed Nov. 26, 2008, file through Mar. 7, 2012, 279 pages.
First Office Action with Search Report dated Jan. 14, 2013 (and translation), for Chinese Patent Application No. 200980146623.7, 18 pages.
Letter, dated May 9, 2013, to NTD Patent and Trademark Agency Ltd., regarding Instructions for first Office Action; for Chinese Appl. No. 200980146623.7, 12 pages.
Response to Office Action filed by NTD Patent and Trademark Agency Ltd., for Chinese Appl. No. 200980146623.7, 16 pages.
Letter from Foreign Associate dated Oct. 25, 2013 and Office Action dated Sep. 25, 2013 for CN Pat. Appl. No. 200980146623.7 18 pages.

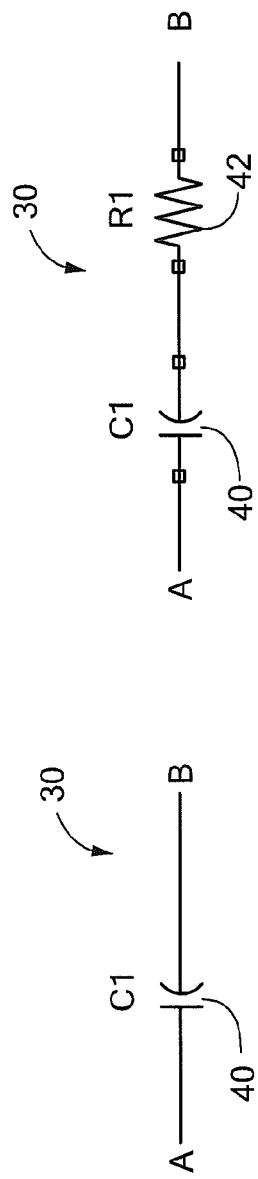
FIG. 2A
FIG. 2B
FIG. 2C
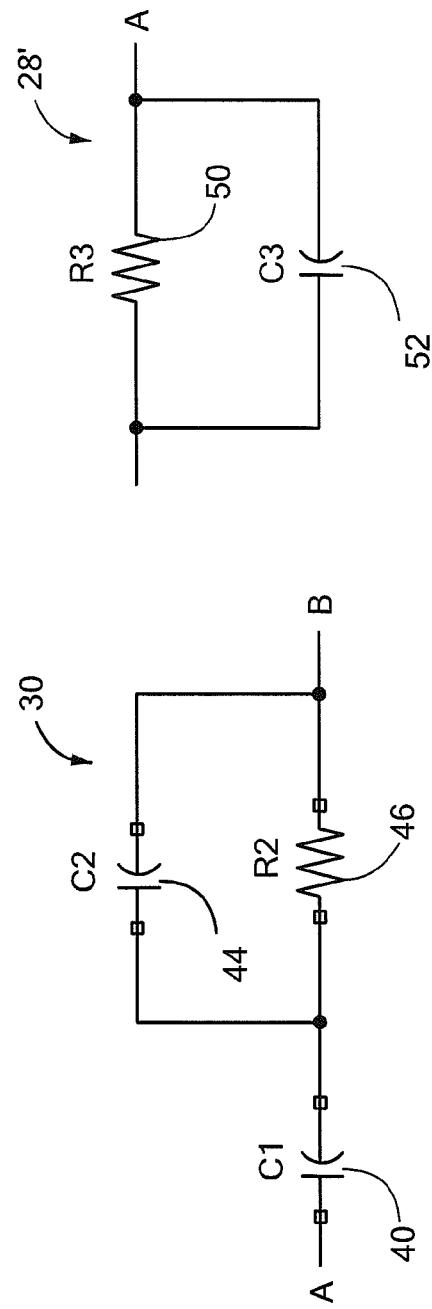
FIG. 3
(PRIOR ART)

US 8,629,642 B2

CLOSED-LOOP MOTOR DRIVER COMPENSATION

CROSS-REFERENCE TO RELATED APPLICATIONS

This application is a continuation of and claims priority to U.S. patent application Ser. No. 12/323,602 filed on Nov. 26, 2008, which is incorporated herein by reference in its entirety.

STATEMENT REGARDING FEDERALLY SPONSORED RESEARCH

Not applicable.

FIELD OF THE INVENTION

This invention relates generally to compensation networks in closed-loop control systems.

BACKGROUND OF THE INVENTION

Closed-loop (feedback) control is commonly employed in control systems. The frequency response of the closed-loop control system can be characterized by the presence of "poles" and "zeros", which are derived from the transfer function that describes that system. The closed-loop control system may be represented graphically by plotting the locations of the poles and zeros on the complex s-plane. The frequency response may be represented graphically in terms of its gain and phase components as a function of frequency. Poles cause a decrease in gain magnitude and phase lag of 90 degrees with frequency, whereas zeros cause an increase in gain magnitude and a phase lead of 90 degrees with frequency.

Often a compensation network is added to the feedback loop or path of the closed-loop control system to obtain stability. Precise locations of the poles and zeros depend on both the desired characteristics of the closed-loop frequency response and the characteristics of the system being controlled.

A lead-lag compensator is a type of compensation network that improves an undesirable system stability and transient response in the system. The lead portion of the lead-lag compensator provides phase lead at high frequencies, which shifts poles to the left for increased damping and phase margin (and therefore increased stability). The lag portion of the lead-lag compensator provides phase lag at low frequencies and a dominant pole.

SUMMARY OF THE INVENTION

In general, in one aspect, the invention is directed to a circuit that includes an error amplifier and a lead-lag compensator. The error amplifier has a first input to receive a reference signal, a second input and an output to produce an error signal based on the first input and the second input. The lead-lag compensator includes a lead portion and a lag portion. The lead portion is connected between the second input of the error amplifier and a feedback path from an external controlled system of a closed-loop control system having an associated frequency response. The lag portion is connected between the second input and the output of the error amplifier. The lead portion includes a network of passive elements connected to provide a high frequency zero for lead compensation and a high frequency pole to reduce the effect of the high frequency zero on the frequency response.

Embodiments of the invention may include one or more of the following features. The lead portion may include a first resistor, a second resistor and a capacitor, the second resistor and the capacitor being connected in series as a series resistive-capacitive (RC) circuit, and the first resistor being connected in parallel with the series RC circuit to form a parallel RC circuit. The inclusion of the second resistor in the parallel RC circuit operates to introduce the high frequency pole. The lead portion may further include a third resistor connected in series with the parallel RC circuit. The lag portion may include a capacitor to provide a dominant low frequency pole. The lag portion may include a resistor connected in series with the capacitor. Alternatively, the lag portion may include a resistor connected in parallel with a second capacitor to form a parallel RC network and the parallel RC network connected in series with the capacitor. The inclusion of the parallel RC network of the lag portion operates to introduce a high frequency pole.

In another aspect, the invention is directed to a device that includes a driver to drive a movement by a motion device as well as a sensor to detect the movement and produce an output based on the detected movement. Also included is a control loop circuit, which is coupled between the sensor and the driver. It is configured to receive as inputs the sensor output and an input provided by an external controller, and to produce an output signal based on the received inputs as an input to the driver. The control loop includes an error amplifier and a lead-lag compensator. The error amplifier has a first input to receive the external controller input as a reference signal, a second input and an output to produce an error signal based on the first input and the second input. The lead-lag compensator includes a lead portion and a lag portion. The lead portion is connected between the second input of the error amplifier and the magnetic field sensor output, and the lag portion is connected between the second input and the output of the error amplifier. The lead portion includes a network of passive elements connected to provide a high frequency zero for lead compensation and a high frequency pole.

In another aspect, the invention is directed to a system having a controller and a linear motion control device coupled to the controller. The linear motion control device includes: a coil driver to drive a coil that, when driven, effects a linear movement by a motion device having a magnet; a magnetic field sensor to detect a magnetic field associated with the linear movement and to produce an output in response thereto; and a control loop circuit coupled between the magnetic field sensor and the coil driver. The control loop circuit is configured to receive as inputs the magnetic field sensor output and an input provided by the controller, and to produce an output signal based on the received inputs as an input to the coil driver. The control loop circuit includes an error amplifier having a first input to receive the controller input as a reference signal, a second input and an output to produce an error signal based on the first input and the second input. It further includes a lead-lag compensator that includes a lead portion and a lag portion, the lead portion being connected between the second input of the error amplifier and magnetic field sensor output, and the lag portion being connected between the second input and the output of the error amplifier. The lead portion includes a network of passive elements connected to provide a high frequency zero for lead compensation and a high frequency pole.

Particular implementations of the invention may provide one or more of the following advantages. Noise may be generated in the feedback path and provided to the input of the lead-lag compensator. Thus, the lead portion of the lead-lag compensator is configured to limit the effect of the lead zero introduced by the lead portion so that noise present at the input to the lead-lag compensator is not amplified by the error amplifier and passed to the output, e.g., in the form of a coil current ripple. Moreover, it limits the noise additive effect of the lead zero without substantially changing the overall system stability. Different selections of lead portion resistor values provide the ability to tune the effect of the lead portion of the lead-lag compensator.

BRIEF DESCRIPTION OF THE DRAWINGS

The foregoing features of the invention, as well as the invention itself, may be more fully understood from the following detailed description of the drawings, in which:

FIGS. 2A-2C are schematic diagrams of an exemplary lag compensation network (FIG. 2A) and exemplary lag-lead compensation networks (FIGS. 2B-2C) for use as the lag portion of the lead-lag compensator (from FIG. 1);

FIG. 3 is a schematic diagram of a conventional lead portion of a lead-lag compensator;

DETAILED DESCRIPTION

Figure 1:
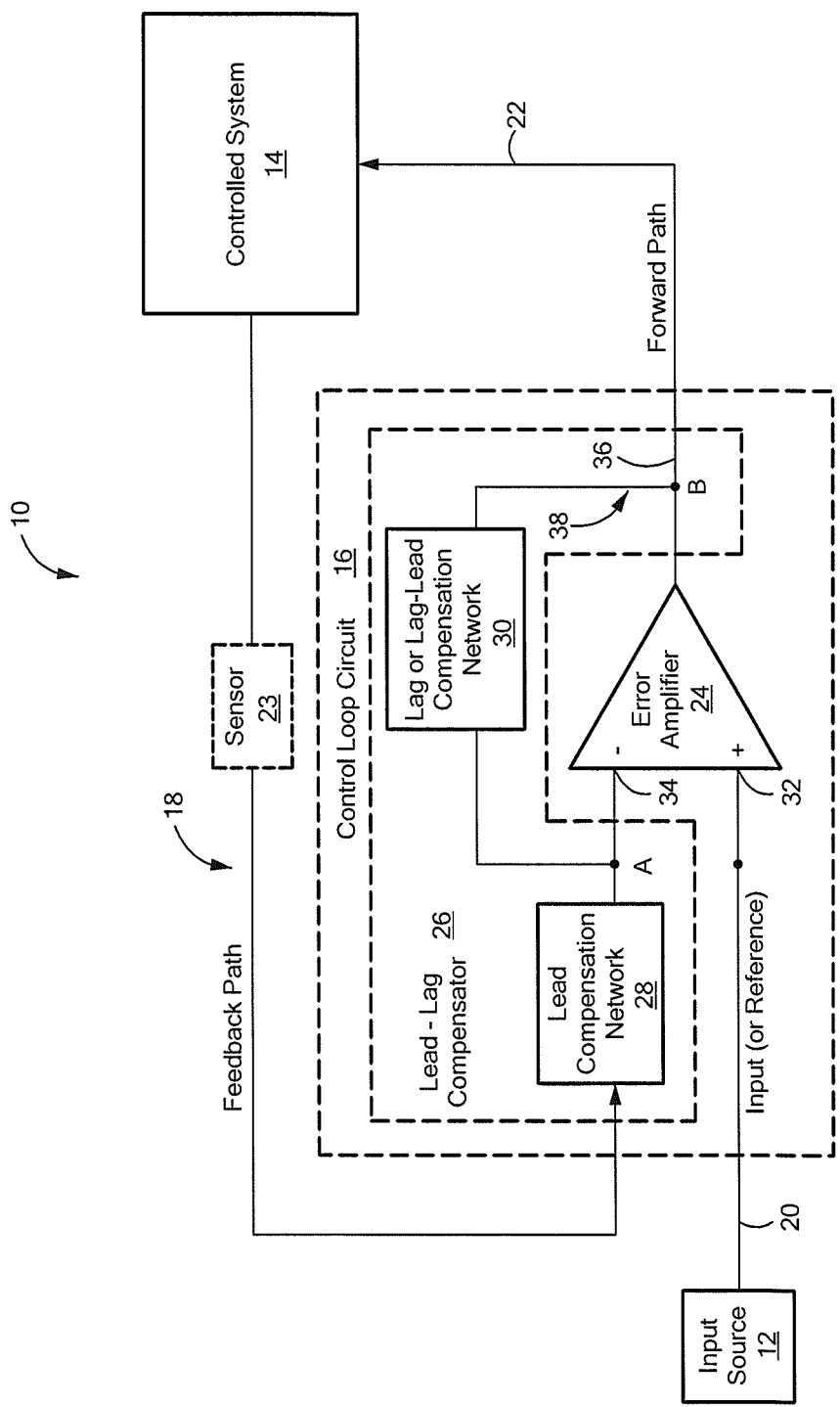
FIG. 1 is a block diagram of an exemplary closed-loop control system employing a lead-lag compensator.

Referring to FIG. 1, a closed-loop control system ("system") 10 is shown. The system 10 includes an input source 12, a controlled system 14 and a control loop circuit ("circuit") 16 coupled between the input source 12 and the controlled system 14. The circuit 16 receives feedback information from the controlled system 14 via a feedback path 18 as well as input 20 from the input source 12. The circuit 16 produces error information based on the received feedback and input information, and provides that error information to a forward path 22 between the circuit 16 and the controlled system 14. It will be understood that the feedback path may be implemented to include, for example, a sensor 23 and/or other feedback path elements. Likewise the forward path 22 may be implemented to include forward path elements (e.g., a driver circuit) that may be appropriate for the system being controlled. Exemplary systems that include such elements will be described later with reference to FIG. 7 and FIG. 9.

Still referring to FIG. 1, the circuit 16 includes an error amplifier 24 and a lead-lag compensator 26 having a lead portion (lead compensation network) 28 and a lag portion 30. The so-called "lag portion" 30 can be either a lag compensation network or a lag-lead compensation network, as will be discussed later with reference to FIGS. 2A-2C. The error amplifier 24 has a first input or terminal 32, a second input or terminal 34 and an output 36. The lead portion 28 is provided in series between the feedback path 18 and the second input 34 of the error amplifier 24. The lag portion 30 is connected between the second input 34 and the error amplifier's output 36, that is, it is provided in a feedback loop portion 38 of the error amplifier 24.

The terms "low frequency" and "high frequency", which are used to describe poles and zeros, are defined herein as follows. "Low frequency" refers to those frequencies below the unity gain crossing of a multi-order closed-loop system with one pole defined as the dominant pole. "High frequency" refers to frequencies above the unity gain crossing of the ideal system.

It is assumed that, based on physical characteristics, e.g., physical dimensions, of the controlled system 14, the controlled system 14 has associated with it one or more low frequency "mechanical" poles that will cause the system to be unstable if uncompensated. Thus, the lead-lag compensator 26 provides appropriate compensation to improve the response parameters of the system 10. In addition, the lead portion 28, referred to hereinafter as the "modified lead portion" 28 to distinguish it from conventional lead compensators (an example of which is shown in FIG. 3), is configured to reduce output noise as well. The output noise may be, for example, noise originating in the feedback path and which, when amplified by the error amplifier 24, has undesirable consequences at the controlled system 14. The circuit 16 thus features lead-lag compensation for a closed-loop control system in which the effect of the lead portion of the compensation is dampened to reduce output noise at the controlled system 14.

Figure 4:
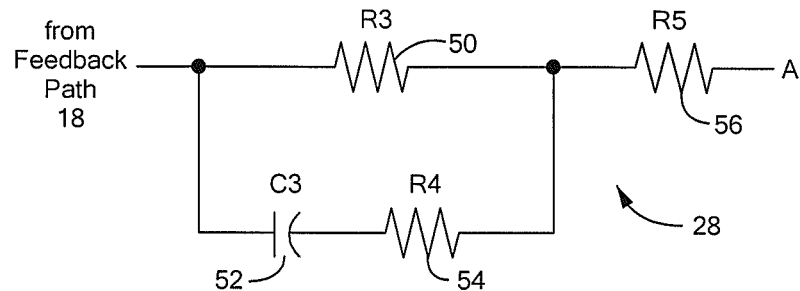
FIG. 4 is a schematic diagram of an exemplary lead compensation network for use as the lead portion of the lead-lag compensator (from FIG. 1)

FIGS. 2A-2C, 3 and 4 illustrate details of the lead-lag compensation. FIGS. 2A-2C show alternative exemplary embodiments of the lag portion 30. FIG. 3 shows a conventional structure for a lead portion of a lead-lag compensator. FIG. 4 shows "the modified lead portion" 28.

Turning first to FIG. 2A, the lag portion 30 is implemented as a lag compensation network with a capacitor ("C1") 40. The capacitor 40 is connected between the error amplifier's input (indicated here and in FIG. 1 as a node "A") and output (indicated here and in FIG. 1 as a node "B"). In FIGS. 2B-2C, the lag portion 30 is implemented as a lag-lead compensation network. Referring to FIG. 2B, the lag-lead compensation network includes a series resistive-capacitive (RC) network that includes a first resistor ("R1") 42 connected in series with the capacitor C1 40 (from FIG. 2A). In yet another lag-lead compensation network embodiment of the lag portion 30, as shown in FIG. 2C, the capacitor C1 40 is connected in series with a parallel RC network formed by connecting a second capacitor ("C2") 44 in parallel with a resistor ("R2") 46.

FIG. 3 shows a conventional lead portion, shown as lead portion 28'. It includes a resistor ("R3") 50 connected in parallel to a capacitor ("C3") 52 to form a parallel RC network.

FIG. 4 shows the "modified lead portion" 28, which is coupled between the feedback path 18 and node "A". In the modified lead portion 28, the parallel RC network of 28' (FIG. 3) is modified to include a second resistor ("R4") 54 connected in series with C3 52. Optionally, as will be discussed later, the network 28 can be further modified to include a third resistor ("R5") 56 connected in series with the modified parallel RC network and coupled between that network and node A.

Referring back to FIGS. 1, 2A-2C and 3, in conjunction with FIG. 4, providing the capacitor C1 40 in the feedback loop of the error amplifier 24 as a lag compensator element serves to introduce a dominant low frequency "lag" pole ("P1") into the system's response. More specifically, C1*R3 multiplied by the error amplifier's gain, sets the dominant pole. Adding the capacitor C3 in parallel with the resistor R3, which forms a conventional lead compensation network, introduces a "lead" zero ("Z2") to cancel the existing mechanical pole (thus insuring closed-loop stability). It may not be possible to add a zero at a low enough frequency. Instead, it may be necessary to add a high frequency zero with the lead compensation network. Adding a high frequency zero, however, makes the system even more sensitive to noise that may be present at the feedback input of the error amplifier 24.

As mentioned earlier, the noise will be amplified by the error amplifier 24 and propagated through to the controlled system 14. For example, if the forward path is designed as a coil driver to drive a controlled system such as a linear motor, the noise may be presented to the linear motor as coil current noise, possibly resulting in an objectionable audible tone at the linear motor. Thus, to lessen somewhat the effect of the high frequency lead zero, the modified lead portion 28 is designed to add another pole, a high frequency lead pole ("P2"), to the system response. More specifically, the lead pole is introduced by adding the resistor R4 54 in series with the capacitor C3 52, as shown in FIG. 4. This lead pole is located (within the complex plane of the system's transfer function) so that the system still receives some benefit from of the placement of the lead zero. The system response can be tuned further by adding the resistor R5 56 in series between the parallel RC circuit and the error amplifier input, as mentioned earlier. The addition of R5 allows for more flexibility in the placement of pole values. The inclusion of one or both of the resistors R4 and R5 can correct for noise while affecting other aspects of the compensation design in a very minimal manner.

Selection of lead portion component values for C3, R3, R4 and R5 is, of course, system dependent. Preferably, resistive lead compensator component values are chosen so that the value of R3 is greater than the values of R4 and R5, and is substantially greater than that of R5. For example, the value of R4 could be chosen to be one-third the value of R3, and the value of R5 could be much less, even close to zero. The values of R4 and R5 can be adjusted to locate the poles and zeros so that a desired response is obtained.

Referring again to FIGS. 2B-2C, the inclusion of the resistor R1 42 to the lag portion 30 serves to provide a low frequency lead zero (Z1), which can improve the effectiveness of the compensation. The relative frequency values of the poles and zeros for the modified lead portion 28 and the lag portion 30 of FIG. 28 in order of increasing frequency value is: P1<Z1<Z2<P2. The inclusion of the RC network (made up of R2 46 and C2 44) in the lag portion 30, as shown in FIG. 2C, generates another pole, a high frequency lag pole ("P2'"), providing for additional attenuation of the high frequency noise. Thus, the relative frequency values of the poles and zeros for the modified lead portion 28 along with the lag portion 30 as depicted in FIG. 2C is: P1<Z2<P2<P2'. More generally, the frequency value of pole P2' will always be greater than that of the dominant pole P1, but does not have to be greater than that of the pole P2.

Depending on the mechanical system being compensated, some mechanical poles may fall at low or high frequencies and therefore require a combination of low and high frequency zeros (such as zeros Z2 and Z1, in the examples above) for optimal compensation. Additional poles included to reduce system noise (such as poles P2 and P2', in the examples above), will be high frequency poles, as described.

Although the passive elements in compensation networks 28, 30 are depicted as individual resistors and capacitors, it will be appreciated that they can be configured using various combinations of such passive elements. In addition, the passive elements can be configured using variable elements. Also, the passive elements can consist of active elements. For example, the resistors can be configured using biased transistors.

Figure 5:
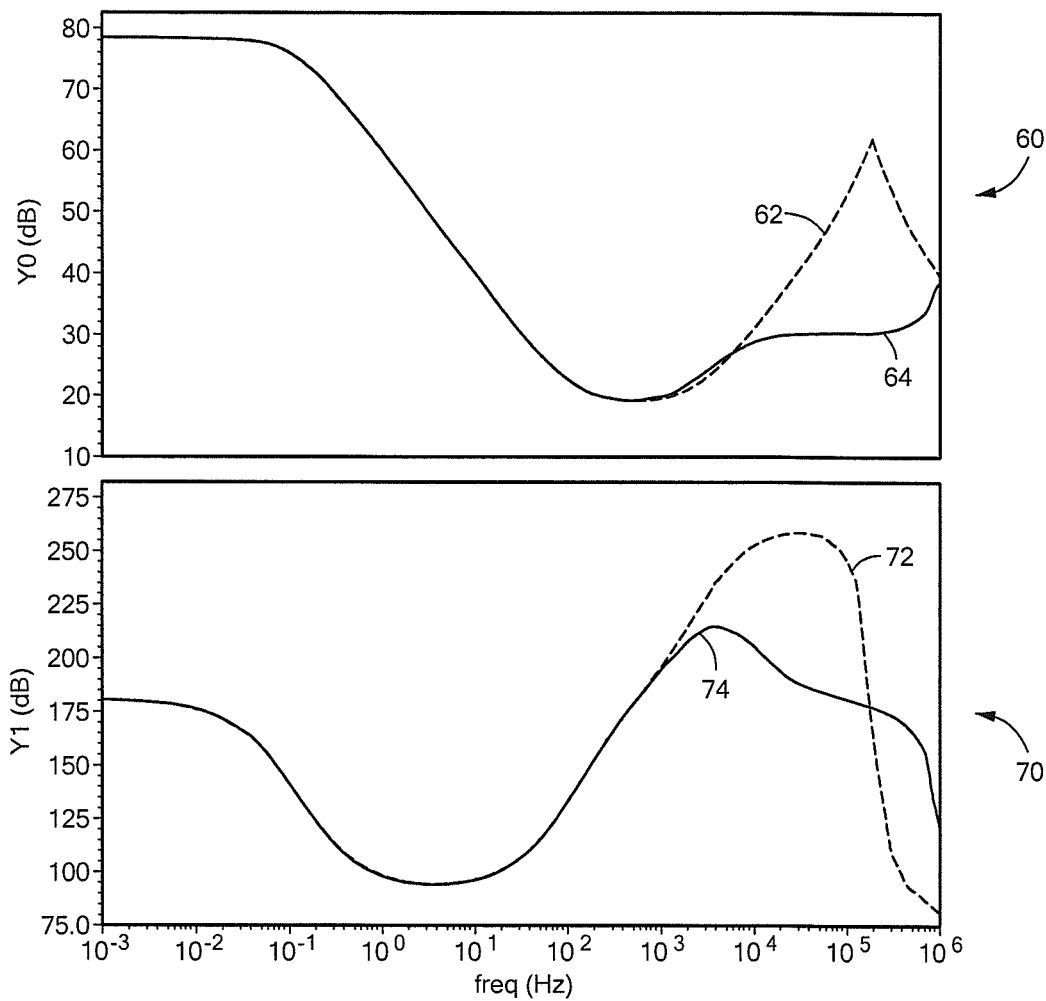
FIG. 5 is a set of plots for gain and phase as a function of frequency for the closed-loop control system having a "modified" lead portion (as shown in FIG. 4) and a conventional lead portion (as shown in FIG. 3)

FIG. 5 shows a Bode gain magnitude and phase plot set of the frequency response. A magnitude plot 60 shows a comparison between the conventional (or traditional) lead-lag compensator gain (curve 62) and the lead-lag compensator gain with the modified lead portion 28 (curve 64). It can be seen from the curves that the modified lead portion, and more specifically, the generation of a high frequency pole, removes the gain peak above 10 KHz (which occurs as the result of the high frequency lead zero) shown in the curve for the traditional network. A corresponding phase plot 70 also shows a comparison between the conventional (or traditional) lead-lag compensator phase (curve 72) and the lead-lag compensator phase with the modified lead portion (curve 74). It can be seen from these curves that the modified lead compensation network, again, specifically, the generation of a high frequency pole, reduces the phase at higher frequencies. Thus, the magnitude and phase characteristics can be adjusted by choosing appropriate compensation structures.

FIGS. 6A-6F show Bode plots of simulations for the closed-loop control system 10 (from FIG. 1) for varying values of R4 and R5 of the lead-lag compensator with the modified lead portion 28. The resistor R3 was set at 2M ohms for all simulations.

Figure 6A:
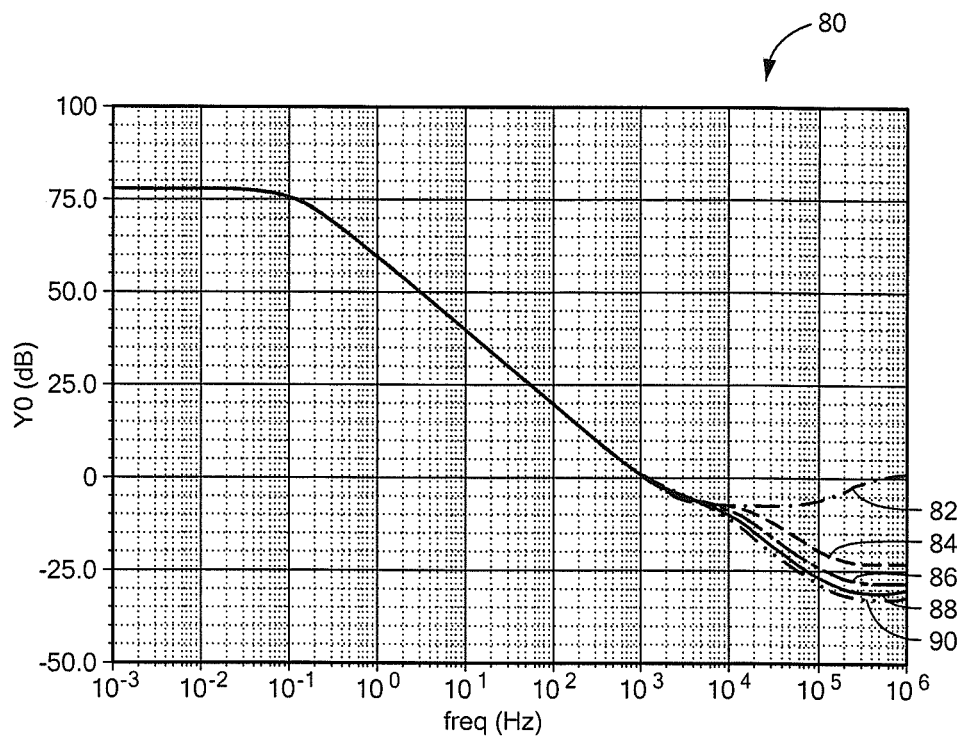
FIGS. 6A-6F are plots of gain and phase versus frequency for the closed-loop control system for different values of lead portion resistive elements.
Figure 6B:
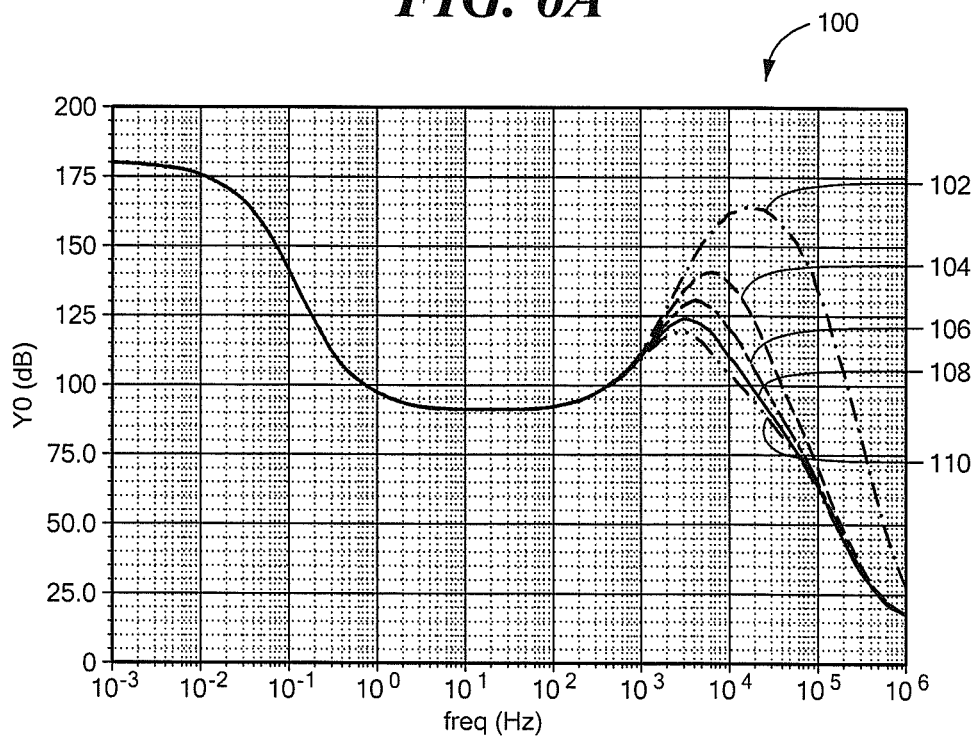

FIG. 6A shows a plot 80 of gain versus frequency for different values of R4, specifically, R4=0 (curve 82), 250K (curve 84), 500K (curve 86), 750K (curve 88) and 1M ohms (curve 90), while R5 was held at zero. FIG. 6B shows a corresponding plot 100 of phase versus frequency for different values of R4, again with R4=0 (curve 102), 250K (curve 104), 500K (curve 106), 750K (curve 108) and 1M ohms (curve 110), while R5 was held at zero.

Figure 6C:
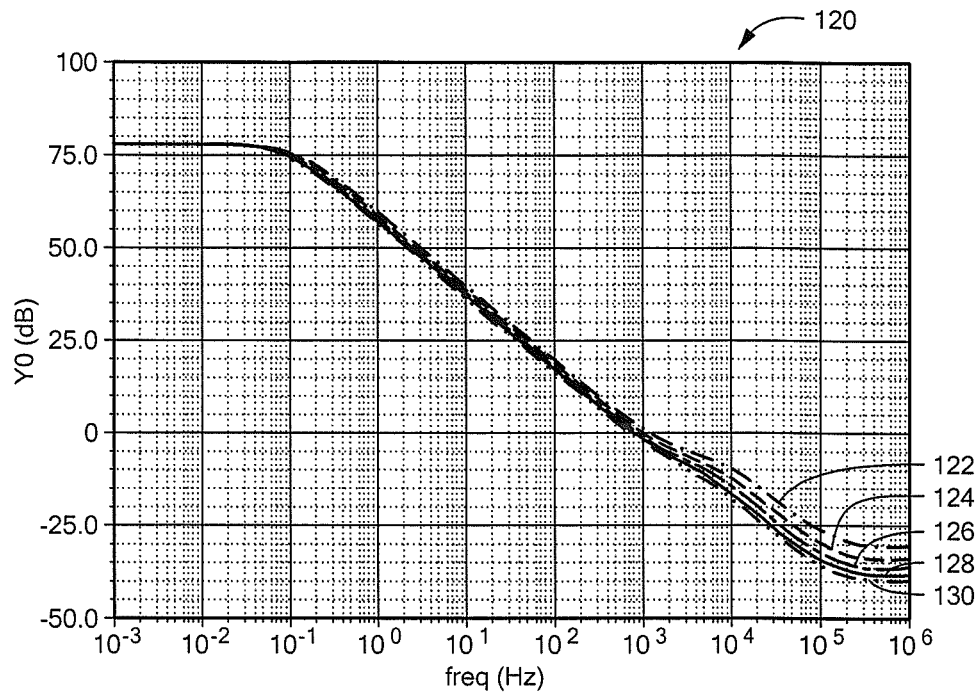
Figure 6D:
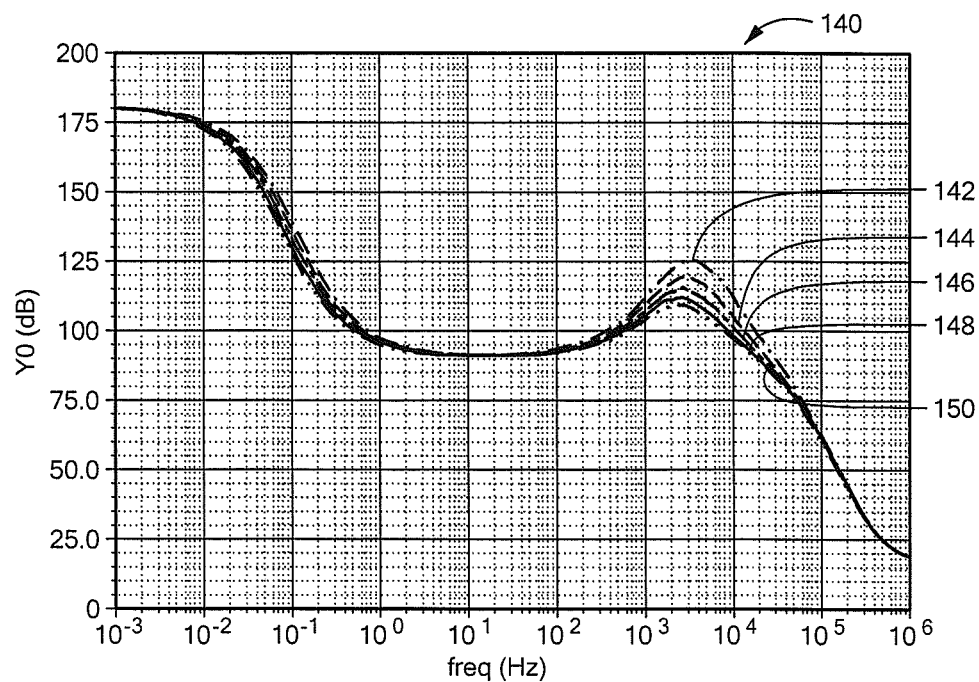

FIG. 6C shows a plot 120 of gain versus frequency for different values of R5, specifically, R5=0 (curve 122), 250K (curve 124), 500K (curve 126), 750K (curve 128) and 1M ohms (curve 130), while R4 was held at zero. FIG. 6D shows a corresponding plot 140 of phase versus frequency for different values of R5, again with R5=0 (curve 142), 250K (curve 144), 500K (curve 146), 750K (curve 148) and 1M ohms (curve 150), while R4 was held at zero.

Figure 6E:
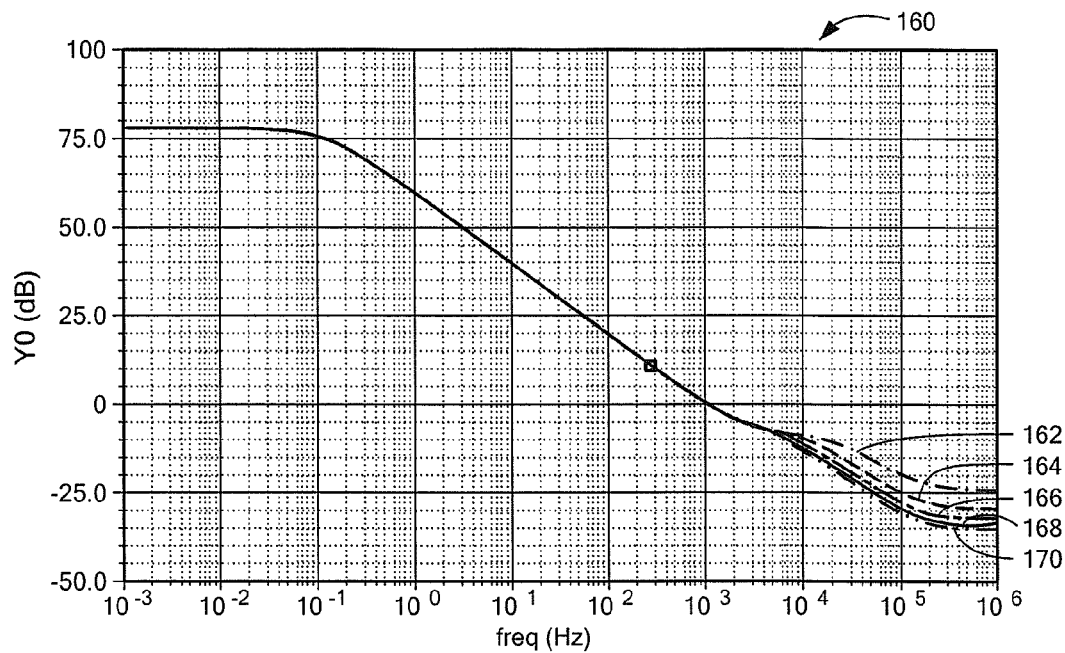
Figure 6F:
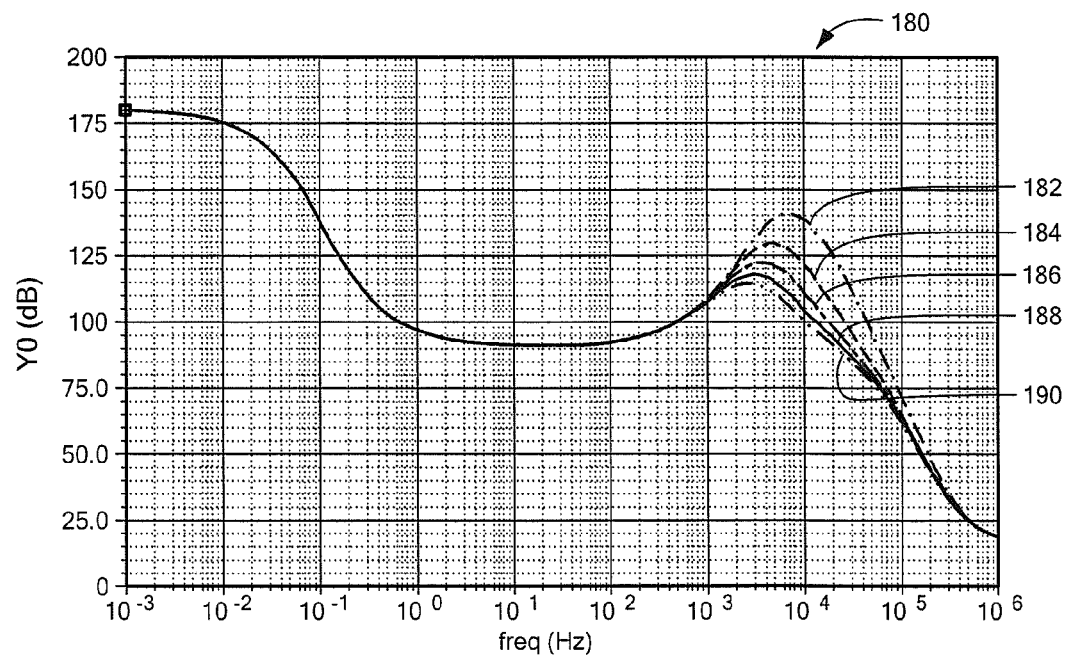

FIG. 6E shows a plot 160 of gain versus frequency for different values of R4, with R4=0 (curve 162), 250K (curve 164), 500K (curve 166), 750K (curve 168) and 1M ohms (curve 170), while R5 was set to 250K ohms. FIG. 6F shows a corresponding plot 180 of phase versus frequency for R4=0 (curve 182), 250K (curve 184), 500K (curve 186), 750K (curve 188) and 1M ohms (curve 190), while R5 was set to 250K ohms.

It can be seen from the curves shown in FIGS. 6A-6F that the effect of having R5 in the lead compensation network 28 is to cause the gain and phase curves to slope downward at higher frequencies. Also, increasing the value of R4 causes R4 to have an effect on the response at increasingly lower frequencies. More generally, the use of R4 and R5 allows the system designer to more easily tune the response of the system. They can be varied to adjust the stability and noise of the system to meet desired design parameters.

Figure 7:
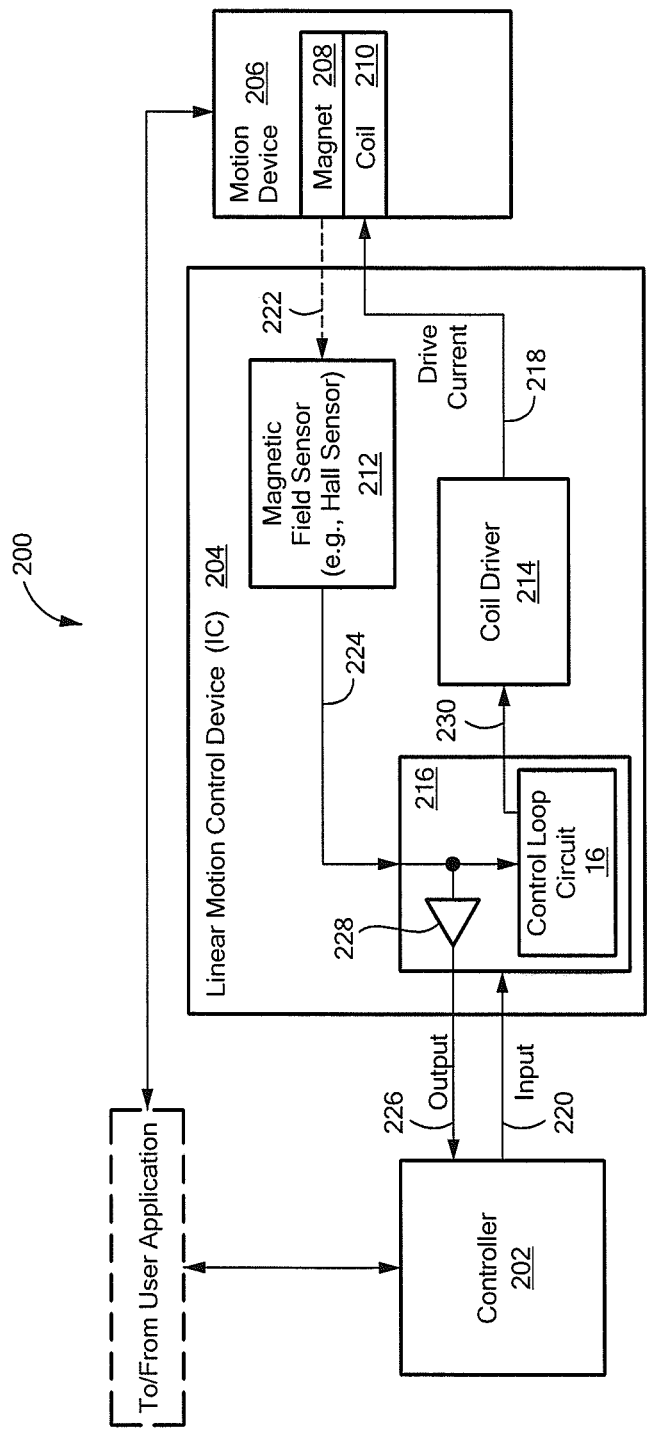
FIG. 7 is a block diagram of an exemplary closed-loop control system employing a linear motion control device that includes a magnetic field sensor, a coil driver and a sensor-to-driver feedback interface that includes the lead-lag compensator shown in FIG. 1.

FIG. 7 shows an exemplary control system 200 that provides closed-loop motion control to a positioning application. The control system 200 includes a controller (e.g., a microcontroller or processor) 202 connected to a motion control device (or "device") 204. The control system 200 also includes a motion device 206, which includes an assembly having a magnet 208 and a coil 210. The magnet/coil assembly connects to a device or structure to be moved for a given application. In one embodiment, described herein, the magnet 208 is movable relative to the coil 210 and the control system 200 controls the movement of the magnet 208 with the coil 210. The motion device 206 may be any type of linear motion device, for example, a linear motor or linear voice coil actuator. The positioning application may be any application that utilizes a displacement produced by the motion device.

The motion control device 204 includes a position sensor shown as a magnetic field sensor 212, a coil driver 214 and an interface 216 that includes a control loop circuit like control loop circuit 16 from FIG. 1, shown here as control loop circuit 16. The device 204 provides to the coil 210 a current signal 218 that is related to an electrical input 220 received from the controller 202. The device 204 uses the magnetic field sensor 212 to detect magnetic field strength of a magnetic field signal 222. Based on that detection, the magnetic field sensor 212 provides a sensor output signal 224 to the interface 216. The sensor output signal 224 can also be provided to the controller 202 as an output 226 via an interface circuit, for example, a buffer 228.

The magnetic field sensor 212 may be made with any type of magnetic field sensing device (not shown). The magnetic field sensing device may include a single element or, alternatively, may include two or more elements arranged in various configurations, e.g., a half bridge or full (Wheatstone) bridge. The element or elements of the magnetic field sensing device may take a form of, for example, a Hall-effect element or a magnetoresistance (MR) element. An MR element may be made from any type of MR device, including, but not limited to: an anisotropic magnetoresistance (AMR) device; a giant magnetoresistance (GMR) device; a tunneling magnetoresistance (TMR) device; and a device made of a semiconductor material, such as an Indium compound, e.g., Indium-Antimonide (InSb).

Other aspects of the magnetic field sensor 212, also not shown, may be implemented according to known techniques and designs. It will be understood that the magnetic field sensing device will be connected to other circuitry, which may contain various circuits that operate collectively to generate a sensor output from the magnetic field signal.

Although a magnetic field sensor and coil driver are shown, other types of position sensors and driver circuits may be used. Also, the device 204 could be implemented to control movement by a motion device that is rotational (instead of linear as shown).

Still referring to FIG. 7, the interface 216 serves to interface the coil driver 214 to the controller 202 as well as to couple the coil driver 214 to the magnetic field sensor 212. It receives the output of the magnetic field sensor 212, sensor output 224, as an input voltage signal and provides an output voltage signal 230 to the coil driver 214, which the coil driver 214 converts to the drive current (or drive signal) 218 to be applied to the coil 210. The sensor-to-driver connection allows the device 204 to correct position based on sensor feedback internally, that is, without intervention by the controller 202 (and/or user), or the need for other components, to provide positional feedback information.

In one exemplary embodiment, as indicated in FIG. 7, the linear motion control device 204 is implemented as a semiconductor integrated circuit (IC). That is, the magnetic field sensor is integrated with the circuitry of the coil driver 214 and interface 216 on a single semiconductor substrate. Therefore, the device 204 may be manufactured and sold as an IC for use in a module design.

It will be appreciated that FIG. 7 is intended to depict only a functional partitioning of the control system 200. If constructed as an IC, the motion control device 204 may be mounted or embedded in the magnet/coil assembly of the motion device itself. An example of such a magnet/coil assembly, in which the magnet moves relative to a stationary coil, is described in co-pending U.S. patent application Ser. No. 11/865,118, entitled "Hall-Effect Based Linear Motor Controller," filed on Oct. 1, 2007 in the name of David et al. and assigned to Allegro Microsystems, Inc., the assignee of the subject application. In that example, the IC is connected to the drive coil 210, the drive coil 210 is mounted (or coupled) to a biasing mechanism and the movable magnet is suspended above the device/coil structure by a mechanical suspension system that allows movement along a desired path of motion. The magnet/coil assembly could instead employ a stationary magnet and movable coil, or be replaced with some other mechanism capable of producing a change in magnetic field strength with change in position.

In one embodiment, the coil driver 214 may be implemented as an H-bridge or full bridge driver. The H-bridge driver provides for bidirectional current flow, thus enabling a motion device such as a linear motor to run in a forward and reverse direction. This type of coil driver is particularly well-suited to linear motor drive and control of small linear motors such as vibration motors, shutter triggers, polarization filters, speaker control, to give but a few examples. The coil driver current output 218 would connect to both ends of the coil 210.

Alternatively, the coil driver 214 may be implemented as a low-side, voice coil driver. This type of coil driver provides for unidirectional current flow only. The coil driver current output would connect to the low side of the coil 210. The high side of the coil 210 would be connected to an external power supply such as a battery.

Figure 8A:
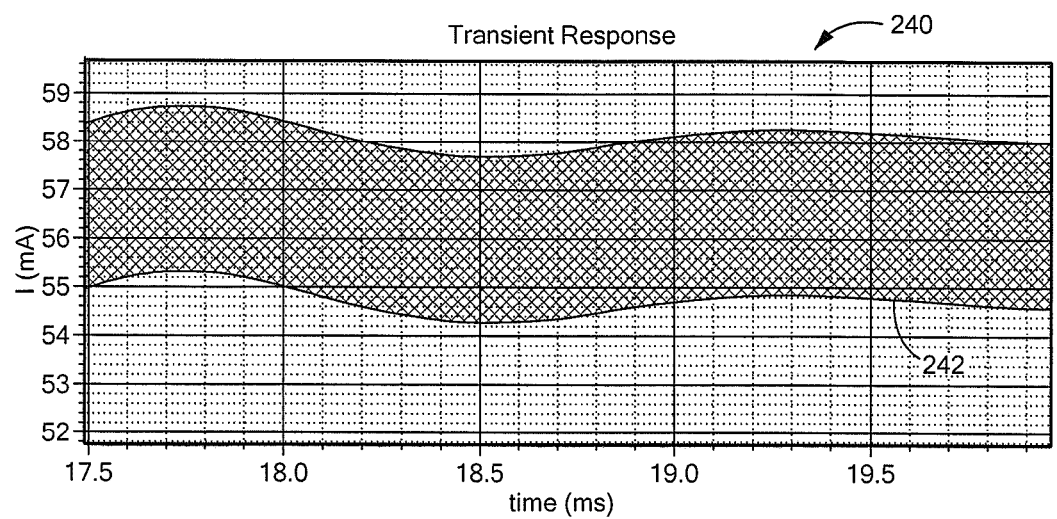
FIGS. 8A-8B are plots of peak-to-peak coil current for a system like that shown in FIG. 7 with the conventional and modified lead-lag compensation.
Figure 8B:
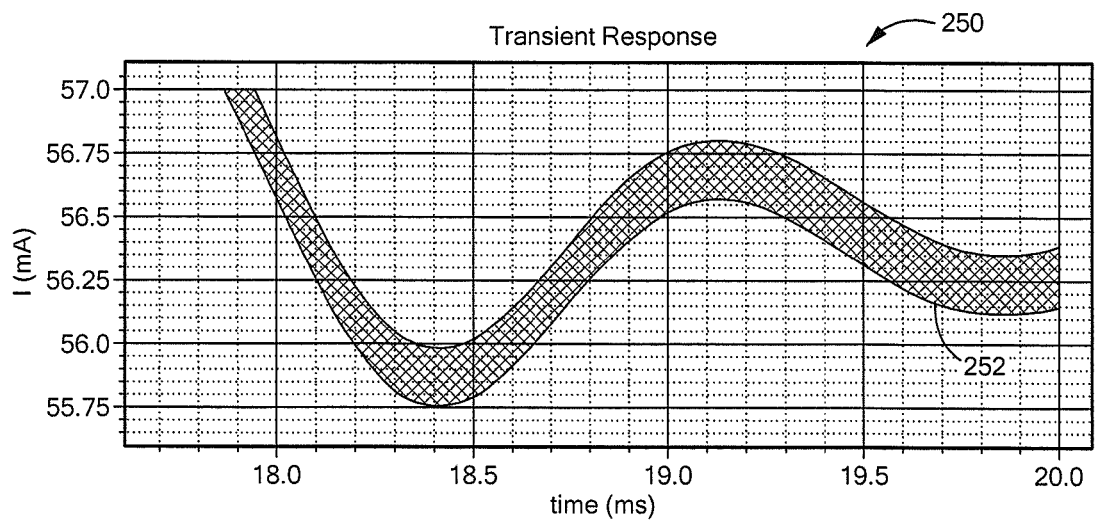

FIGS. 8A-8B show the improvement in coil current noise with the use of the modified lead portion of circuit 16 (from FIG. 1). FIG. 8A shows a transient response plot 240 of a coil current signal 242 for a lead-lag compensator without the modified lead portion 28. FIG. 8B shows a transient response plot 250 of a coil current signal 252 for a lead-lag compensator that includes the modified lead portion 28 and lag portion 30.

Figure 9:
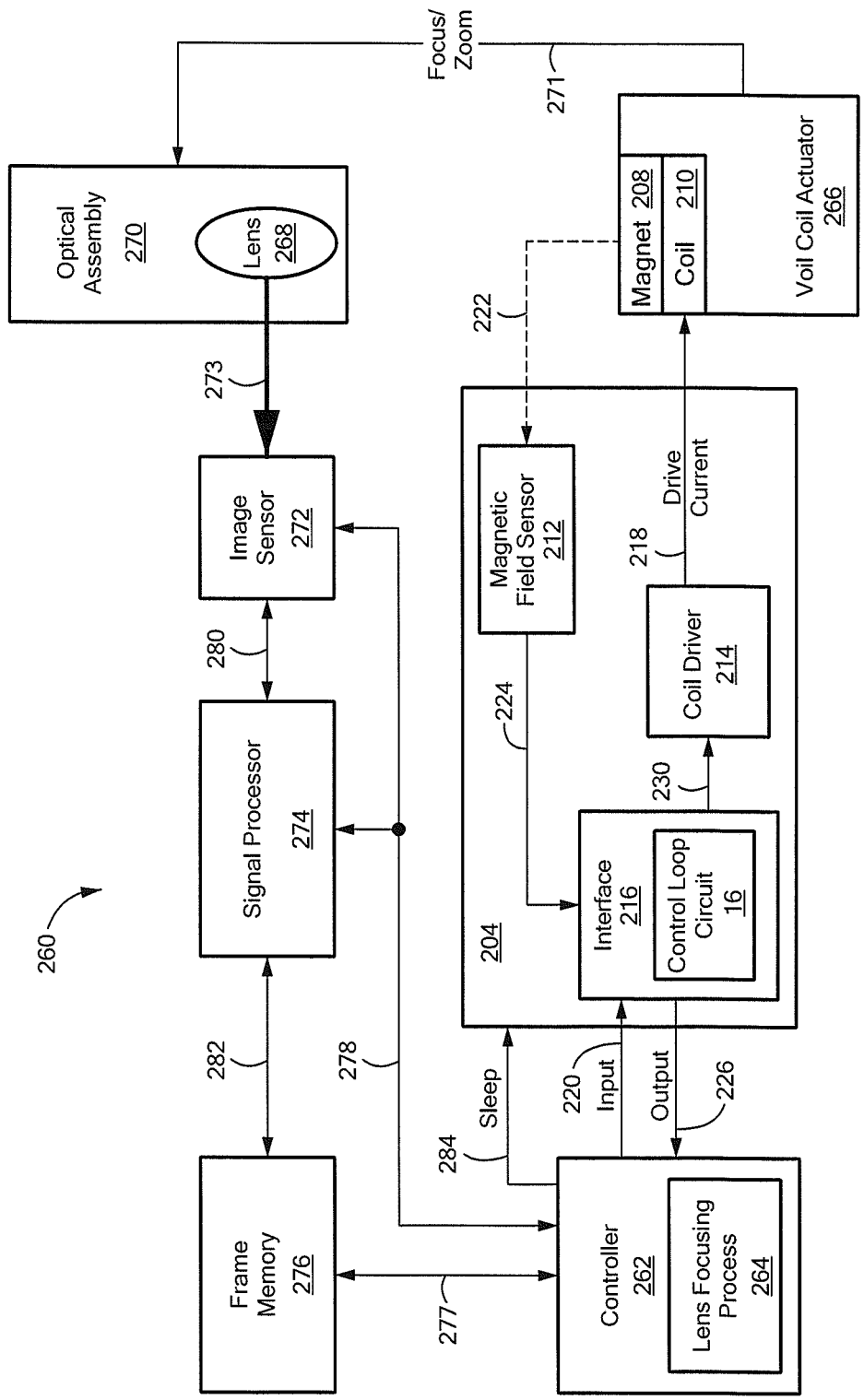
FIG. 9 is a block diagram of an exemplary camera lens focusing system in which a linear motion control device such as that shown in FIG. 7 may be utilized.

The device 204 (FIG. 7), with the lead-lag compensation and other features of interface 216, as described above, may be used in a variety of other applications, such as applications that use voice coil motors or actuators. One example, as shown in FIG. 9, is a camera lens focusing module (or "module") 260 as may be used in a mobile phone with camera, also known as a camera phone. Voice coil motors are useful as actuators in limited motion, high frequency activation applications, such as that of the lens driving device of module 260, as well as other precision instrument applications.

The modified lead portion 28 is particularly well suited for applications like the closed-loop "auto-focus" module 260. In auto-focus modules, noise (e.g., noise from a DAC output) feeds through the compensation network, is amplified and translated to coil current. If the coil noise is high enough and concentrated at a particular frequency, it will be translated to undesirable audible noise at the system output, as was discussed earlier.

The module 260 includes a controller (e.g., microcontroller or processor) 262 that executes a lens focusing process 264 and provides control signals to other blocks of the module. In a camera phone application, the controller 262 may control overall operation of the camera phone and thus switch between telephone and camera functions, or the controller 262 may be dedicated to a camera mode of operation (with a separate controller for handling the telephone mode). The controller 262 is connected to the device 204, which drives a voice coil actuator 266. As indicated earlier with reference to FIG. 7, the device 204 may be constructed as a semiconductor integrated circuit with voice coil driver and magnetic field sensor integrated on a single substrate. Also, the magnet and device/coil assembly may be similar to that described above, but with a coil and coil driver for unidirectional drive. Alternatively, a magnet with a simple spring biasing mechanism could be used.

The voice coil actuator 266 controls the linear movement of a lens 26 of an optical assembly 270 to adjust the lens focus. This lens focus adjustment activity is indicated in the figure by arrow 271 (labeled "Focus/Zoom"). The coil driver 214 of the device 204 controls the voice coil actuator 266. It will be appreciated that some type of actuating mechanism and driver, for example, a piezoelectric actuator and driver, could instead be used. The module 260 also includes an image sensor 272, a signal processor (SP) 274 and a frame memory 276. The frame memory 276 is coupled to the controller 262 via a bus 277. The operation of this module will now be described.

Assuming that the controller 262 has switched to a camera function or is in a camera mode, the image sensor 272 is activated, and the controller 262 sends a control signal (timing signal) via control lines 278 to the image sensor 272 to start an image capturing process. An image projected by the lens 268 onto the image sensor 272 (the projection being indicated by arrow 273) is scanned and applied to the SP 274 via line(s) 280. The controller 262 activates the signal processor 274 to begin auto focus processing. The SP 274 performs sampling, amplification and A/D conversion to an image signal output from the image sensor 272 and outputs the digital image data. The frame memory 276 temporarily stores the digital image data sequentially output from the SP 274 via line(s) 282. The SP 274 determines a contrast value of the image according to the image data stored in the frame memory 276. Every time the image is captured by the image sensor 272 and that image is stored in the frame memory 276, the SP 274 reads the image data and calculates the contrast value.

The controller 262 outputs a control signal, input 220, to the linear motion control device 204 to begin focus adjustment. The driver portion of the device 204 generates the drive signal 218 according to the input signal 220 from the controller and the feedback signal 224 from the magnetic field sensor 212. The lens position adjustment by the voice coil actuator 266 results in change in image sharpness. The SP 274 determines contrast value of the image data sequentially captured by the image sensor 272 and compares values between images captured before and after lens movement. The SP 274 detects that the image with best sharpness is obtained when the contrast value that is a peak value is detected and sends a detection signal to the controller 262. The controller 262 sends the appropriate control signal (to the device 204) to move the lens 268 back to the position where the peak contrast value was obtained, that is, the precise position to achieve best sharpness to complete the focus adjustment. Although the SP 274 is described as determining a contrast value, other parameters indicative of optimum focal position may be computed by the SP 274.

The signal 220 provided by the controller to the interface 216 of device 204 may be a PWM input signal. If a PWM input is used, it will be translated into an analog voltage. As was described earlier, the feedback circuitry of the interface 216 is used to drive current through an external voice coil. The current in the coil changes until the position of the lens assembly results in a sensor output voltage that has a predetermined relationship with respect to the input, for example, matches the input (or the PWM converted internal analog signal if a PWM input is used). The sensor output is also available to the controller 262 via the output 226 of the interface 216.

The device 204 can also include a user-controlled "Sleep" input, indicated in the figure as Sleep input 284, that reduces the current consumption when the device 204 is in low power sleep mode. End users can control the current consumption of the device 204 by applying a logic level signal to the Sleep input 284. This low power feature makes the device ideal for battery-operated applications such as cellular phones and digital cameras.

One exemplary lens focusing process that can be employed as lens focusing process 264 is described in the above mentioned co-pending U.S. patent application Ser. No. 11/865,118. Other suitable lens focusing processes as well as module designs may be used as well.

Other image capturing applications are also contemplated. For example, although the circuit 16 is shown as being utilized in an auto-focus application module, the hardware and/or software of the module 260 could be suitably adapted to perform other functions, such as image stabilization, in lieu of or in addition to lens movement control. Like the lens movement control, some types of image stabilization applications may use sensors in a feedback control loop to detect movement (camera movement due to hand shake in the case of image stabilization, instead of lens focusing or zoom as shown for the auto-focus module 260) and use the detected movement to take appropriate corrective action via an actuating mechanism. Other types of image stabilizers may be implemented in software (executed by a processor, for example, a microcontroller like controller 262 or signal processor like SP 274 of FIG. 9). In any of these types of designs, the circuit 16 (with compensation networks 28, 30 as described above), could be used between feedback sensor(s) and drive circuitry that drives the actuator to provide both compensation and noise reduction.

Although specific example embodiments of the closed-loop control system 10 of FIG. 1 described above with reference to FIGS. 7 and 9 illustrate a feedback path with magnetic field sensor, a forward path with a coil driver circuit and a controlled system in the form of a linear motion device such as a linear motor or voice coil actuator with magnet/coil assembly, other embodiments are contemplated as well. A sensor like sensor 23 in the feedback path may be any type of sensor, i.e., one that is suitable to detecting or measuring a particular physical parameter, such as movement/motion (e.g., in terms of position, proximity, displacement, speed, direction and derivatives thereof), light, pressure, stress/strain, temperature, and the like, as required by a desired application of the control system 10. Any sensor construction, whether it be electromagnetic, optical, capacitive, resistive or piezoelectric, to give but a few examples, that is suitable for the type of sensing to be performed can be used as well. Also, in addition to being a linear motor or actuator, as illustrated in the figures, the controlled system 14 may be a rotational motor or other type of machine or system (for example, those found in typical industrial, automotive or consumer applications).

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A circuit comprising:
an error amplifier having a first input to receive a reference signal, a second input and an output to produce an error signal based on the first input and the second input;
a lead-lag compensator comprising a lead portion and a lag portion, the lead portion being connected between the second input of the error amplifier and a feedback path from an external controlled system of a closed-loop control system having an associated frequency response, and the lag portion being connected between the second input and the output of the error amplifier;
wherein the lead portion comprises a network of passive elements connected to provide a high frequency zero for lead compensation and a high frequency pole to reduce the effect of the high frequency zero on the frequency response;
wherein the lag portion comprises a capacitor to provide a dominant low frequency pole; and
wherein the lag portion comprises a resistor connected in parallel with a second capacitor to form a parallel RC network and the parallel RC network is connected in series with the capacitor.

2. The circuit of claim 1 wherein the lead portion comprises a first resistor, a second resistor and a capacitor, the capacitor and the second resistor being connected in series and the first resistor being connected in parallel with the capacitor and the second resistor.

3. The circuit of claim 2 wherein, in the lead portion, inclusion of the second resistor operates to introduce the high frequency pole and inclusion of the first resistor and the capacitor operates to introduce the high frequency zero, and further wherein, in the lag portion, inclusion of the parallel RC circuit operates to introduce a high frequency lag pole.

4. The circuit of claim 3 wherein the dominant low frequency pole has a frequency value that is less than a frequency value of the high frequency zero, the frequency value of the high frequency zero is less than a frequency value of the high frequency pole, and the frequency value of the high frequency pole is less than a frequency value of the high frequency lag pole.

5. The circuit of claim 1 wherein inclusion of the parallel RC network of the lag portion operates to introduce a high frequency pole.

6. The circuit of claim 1 wherein the sensor comprises a magnetic field sensor operable to detect movement by the external controlled system.

7. The circuit of claim 1 wherein the reference signal comprises an input signal based on a control signal from a controller.

8. A device comprising:
a driver to drive a movement by a motion device;
a sensor to detect the movement and to produce an output in response thereto;
a control loop circuit coupled between the sensor and the driver, the control loop circuit configured to receive as inputs the sensor output and an input provided by an external controller, and to produce an output signal based on the received inputs as an input to the driver; and
wherein the control loop circuit comprises:
an error amplifier having a first input to receive the external controller input as a reference signal, a second input and an output to produce an error signal based on the first input and the second input;
a lead-lag compensator comprising a lead portion and a lag portion, the lead portion being connected between the second input of the error amplifier and the sensor output, and the lag portion being connected between the second input and the output of the error amplifier;
wherein the lead portion comprises a network of passive elements connected to provide a high frequency zero for lead compensation and a high frequency pole; and
wherein the lag portion comprises a resistor connected in parallel with a second capacitor to form a parallel RC network and the parallel RC network is connected in series with the capacitor.

9. The device of claim 8 wherein inclusion of the parallel RC network of the lag portion operates to introduce a high frequency pole.

10. A system comprising:
a controller; and
a linear motion control device, coupled to the controller, comprising:
a coil driver to drive a coil that, when driven, effects a linear movement by a motion device having a magnet;
a magnetic field sensor to detect a magnetic field associated with the linear movement and to produce an output in response thereto;
a control loop circuit coupled between the magnetic field sensor and the coil driver, the control loop circuit configured to receive as inputs the magnetic field sensor output and an input provided by the controller, and to produce an output signal based on the received inputs as an input to the coil driver; and
wherein the control loop circuit comprises:
an error amplifier having a first input to receive the controller input as a reference signal, a second input and an output to produce an error signal based on the first input and the second input;
a lead-lag compensator comprising a lead portion and a lag portion, the lead portion being connected between the second input of the error amplifier and magnetic field sensor output, and the lag portion being connected between the second input and the output of the error amplifier;
wherein the lead portion comprises a network of passive elements connected to provide a high frequency zero for lead compensation and a high frequency pole; and
wherein the lag portion comprises a resistor connected in parallel with a second capacitor to form a parallel RC network and the parallel RC network is connected in series with the capacitor.

* * * * *

UNITED STATES PATENT AND TRADEMARK OFFICE
CERTIFICATE OF CORRECTION

PATENT NO. : 8,629,642 B2  
APPLICATION NO. : 13/396929  
DATED : January 14, 2014  
INVENTOR(S) : Michael G. Ward et al.

Page 1 of 1

It is certified that error appears in the above-identified patent and that said Letters Patent is hereby corrected as shown below:

In the Specification

Column 5, Lines 30-31, delete "from of the" and replace with --from the--.

Column 5, Line 54, delete "FIG. 28" and replace with --FIG. 2B--.

Column 9, Line 17, delete "lens 26" and replace with --lens 268--.

Signed and Sealed this  
Twenty-third Day of June, 2015

Michelle K. Lee  
*Director of the United States Patent and Trademark Office*